United States Patent [19]
Bernard

[11] 3,982,722
[45] Sept. 28, 1976

[54] MAGNETIC CONTROL VALVE

[75] Inventor: James A. Bernard, Dayton, Ohio

[73] Assignee: General Motors Corporation, Detroit, Mich.

[22] Filed: Nov. 21, 1975

[21] Appl. No.: 634,160

[52] U.S. Cl. ................................. 251/4; 251/137; 251/139
[51] Int. Cl.² ......................................... F16K 7/04
[58] Field of Search .................. 251/4, 5, 137, 139; 137/251 A, 13; 138/45

[56] References Cited
UNITED STATES PATENTS
2,241,086  5/1941  Gould ................................. 251/5 X
2,743,898  5/1956  King ................................... 251/139

*Primary Examiner*—Martin P. Schwadron
*Assistant Examiner*—Richard Gerard
*Attorney, Agent, or Firm*—K. H. MacLean, Jr.

[57] ABSTRACT

A fluid control valve for a fluid system, such as an air conditioning system, in which a flow passage is defined by a radially flexible tubular member so that the flow area of the valve therethrough is variable. The tubular member and an encircling magnetic field producing means define an annular space therebetween containing a plurality of small iron particles which are attracted to an intermediate portion of the annular space when a magnetic field is produced, thereby causing inward movement of the flexible tubular member to decrease the valve's flow area.

3 Claims, 3 Drawing Figures

MAGNETIC CONTROL VALVE

This invention relates to a fluid control valve for fluid systems, such as an air conditioning system or the like and, more particularly, to a valve in which fluid flows through a flexible tubular member attached to support structure at both ends and whose intermediate portion is movable in a radial direction to control a flow passage by means of the selective energization of an encircling magnetic field producing means.

Fluid systems in general, and particularly air conditioning systems, having previously used expensive and relatively complex control valves to regulate refrigerant flow. Specifically, in the air conditioning system presently used in automobiles by General Motors Corporation, it is desirable to employ a throttling type control valve between the evaporator and the compressor inlet to maintain the refrigerant pressure in the evaporator above a level which corresponds to freezing temperatures of the external surfaces. This pressure and temperature control prevents undesirable frost formation on the evaporator. These throttling valves have commonly employed pressure or temperature responsive actuators to control movement of a valve in a housing. The resultant throttling action or flow restriction caused by valve movement maintains sufficient evaporator pressure to prevent freezing temperatures.

Expansion valves are used in air conditioning systems to control refrigerant flow to the evaporator, normally in response to temperature or pressure conditions therein. Like the aforedescribed throttling valve, an expansion valve utilizes a relatively large number of parts which include movable valving members. The utility of these complex valve assemblies may be affected by valve sticking or any other mechanical problem. Replacement of the valve requires discharging the refrigerant in the system and later refilling the system, a significant expense.

The subject control valve has few parts, none of which move against one another so that sticking or wear occur. Specifically, the valve includes a flexible tubular member which forms a flow passage therethrough. The tubular member is encircled by the housing of an electromagnetic coil assembly so as to form an annular space therebetween. The annular space contains a quantity of small particles of a material which is easily magnetized, such as iron. When the electromagnetic coil is energized, the particles are attracted to an intermediate portion of the annular space and an accumulation of particles flexes the tubular member radially inward, thus decreasing the flow area through the control passage and creating a flow restriction.

The magnetic field producing means includes an annularly shaped coil contained within an annular hollow housing of magnetizable material, such as iron. The housing includes an inner cylindrical wall closely encircling the intermediate portion of the tubular member when the valve is in an open operative condition. The inner cylindrical wall is not continuous from one end of the housing to the other, but is separated by an annular channel, the sides of which are defined by spaced end surfaces. When the electromagnetic coil is energized, a magnetic field extends through the coil housing and across the aforesaid channel producing opposite magnetic poles of the end surfaces. The formation of magnetic poles around the intermediate portion of the flexible tubular member attracts a plurality of the aforesaid iron particles toward the center of the annular space. The accumulation of particles exerts a radially inward force on the flexible tubular member which causes the intermediate portion to move radially inwardly and decrease the flow area through the control passage, thereby regulating fluid flow. As a throttling valve, an electromagnetic coil and voltage would be selected to produce a sufficient magnetic attraction to block refrigerant flow through the control passage when the coil is energized. When the subject valve is used as an expansion control between the condenser and the evaporator, the voltage applied should be varied to produce a desired flow into the evaporator corresponding to cooling demands on the evaporator which directly relate to the temperature of air flowing thereover. Numerous temperature and pressure responsive controls are readily availble and these could be used to regulate coil energization in a desirable manner. When used as a suction throttling valve as illustrated in the accompanying drawings, coil energization should be achieved by a simple pressure responsive switching device or by a temperature sensor and switch.

In the preferred embodiment illustrated and described hereinafter, a primary electromagnetic coil adjacent the midportion of the tubular member is provided so that the particles are attracted to the intermediate portion of the tubular member to cause radially inward movement of the tubular member, which restricts refrigerant flow. A pair of secondary electromagnetic coils are located at the ends of the primary coil and are adapted to be energized alternately with respect to the aforedescribed main coil. Thus, when the main coil is de-energized the secondary coils are energized to cause movement of the particles toward the end portions of the annular space which will permit the intermediate portion of the flexible tubular member to move radially outward and increase the flow area through the control valve.

Therefore, an object of the invention is to provide an inexpensive yet durable and reliable valve for fluid flow control in which the flow area through a tubular and flexible member is regulated by the attraction thereabout of magnetically responsive particles to cause radial flexing of the tubular member.

A further object of the invention is to provide a versatile yet durable and reliable valve for controlling fluid flow through a passage in which a flow restriction can be selectively created in varying degrees by the energization of magnetic field producing means encircling the passage, thereby attracting an accumulation of small magnetically responsive particles about a limited zone of the passage to cause the walls of the passage to move radially inward and decrease the flow area through the control valve.

A still further object of the invention is to provide a valve for fluid control including a fluid control passage through a flexible tubular member whose ends are fixed and whose intermediate portion is encircled by at least one electromagnetic coil means which produces a magnetic attraction on magnetically responsive particles, thereby causing a particle accumulation about the intermediate portion of the tubular member which radially moves the walls inward and restricts refrigerant flow through the control valve.

Further objects and advantages of the present invention will be more readily apparent from the following detailed description, reference being had to the accompanying drawings in which a preferred embodiment is illustrated.

IN THE DRAWINGS

Figure 1:
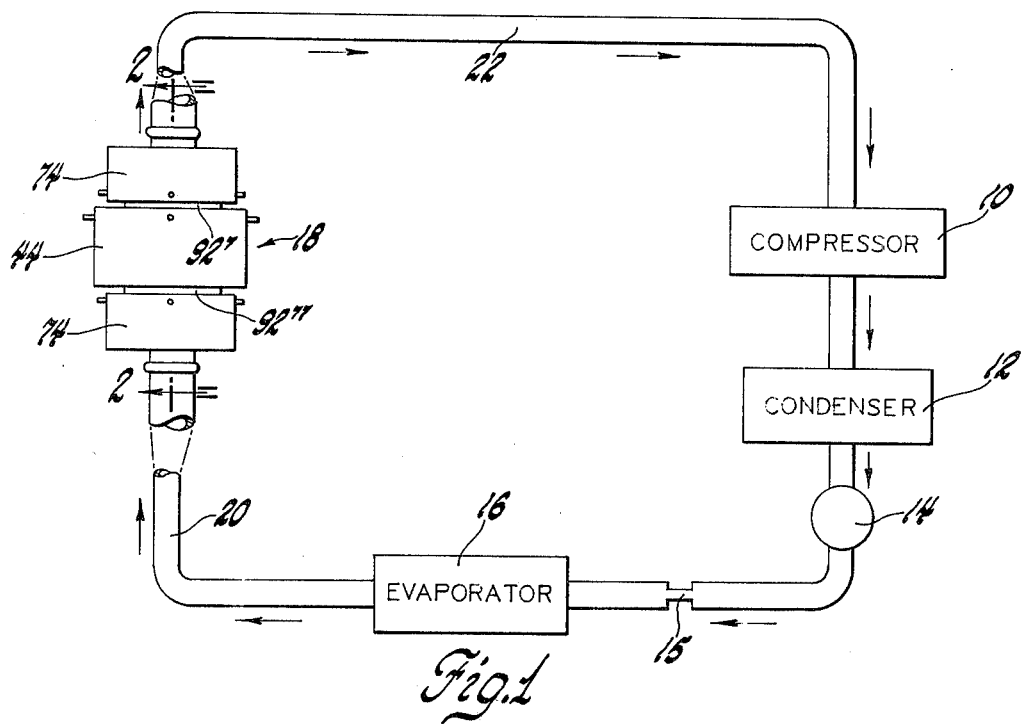
FIG. 1 is a somewhat schematic view of an automotive air conditioning system, including use of the subject control valve as a suction line throttling valve.

In FIG. 1 of the drawings, an automotive air conditioning fluid circuit is shown, including in fluid flow relation a compressor 10, a condenser 12, a receiver-dehydrator 14, a restrictor 15 to decrease refrigerant pressure prior to entry into an evaporator 16 and a suction flow control valve 18 located between the evaporator 16 and the compressor 10. The control valve 18 is so placed to receive refrigerant through a conduit 20 from the evaporator and to pass refrigerant through a suction line conduit 22 to the compressor 10.

During certain periods of operation, the capacity of the compressor to pump refrigerant, and correspondingly to evacuate refrigerant from the evaporator, may greatly exceed the evaporator's capacity to absorb heat from air and produce a sufficient quantity of vaporized refrigerant by vaporization of liquid refrigerant therein. Whenevr this occurs, the evaporator pressure tends to decrease and the corresponding temperature of refrigerant in the evaporator decreases. For the purpose of preventing evaporator pressure and temperature from falling below levels corresponding to freezing temperatures on the external finned surfaces of the evaporator, the subject flow control valve 18 is utilized to limit the discharge of refrigerant from the evaporator. This effectively prevents frost from forming or accumulating.

The aforementioned evaporator freeze conditions occur typically when an air conditioning system is operated in a relatively low ambient temperature environment, say 70° F. Running the compressor at medium to high speeds on a highway trip will likely produce excess pumping capacity with respect to evaporator heat absorbing capacity. The amount of heat which can be absorbed by the evaporator is, of course, limited by the differences in temperature between air passing over the evaporator and the refrigerant therein. Other factors which affect the evaporator capacity are the size and general configuration, including the fin means employed. Thus, during operation under these low ambient temperature conditions, the evaporator cannot absorb sufficient heat to produce the quantity of vaporous refrigerant which the compressor is able to pump from the evaporator. Under these conditions, it is desirable to provide a flow control or limiting valve which makes it possible to maintain evaporator temperature and pressure above the freeze level.

Heretofore, a throttling valve has normally been employed between the compressor and the evaporator to restrict the discharge flow of refrigerant from the evaporator in response to evaporator pressure conditions. The subject control valve is a throttling valve and performs a throttling function. It has desirable characteristics for use in an air conditioning system, as well as other fluid control systems.

Figure 2:
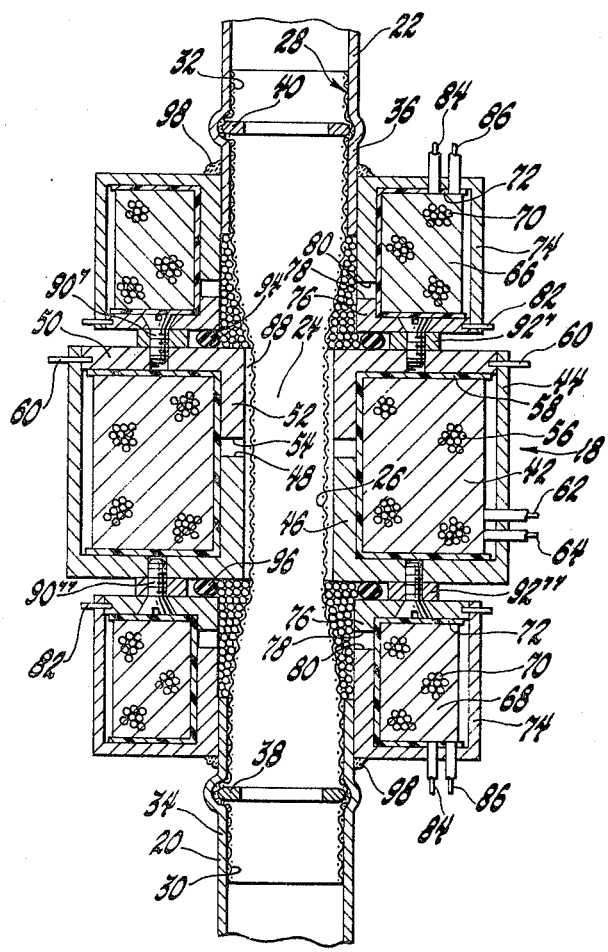
FIG. 2 is an enlarged sectioned view of the control valve looking in the direction of the arrows 2—2 in FIG. 1, and illustrating the valve in an open operative condition.
Figure 3:
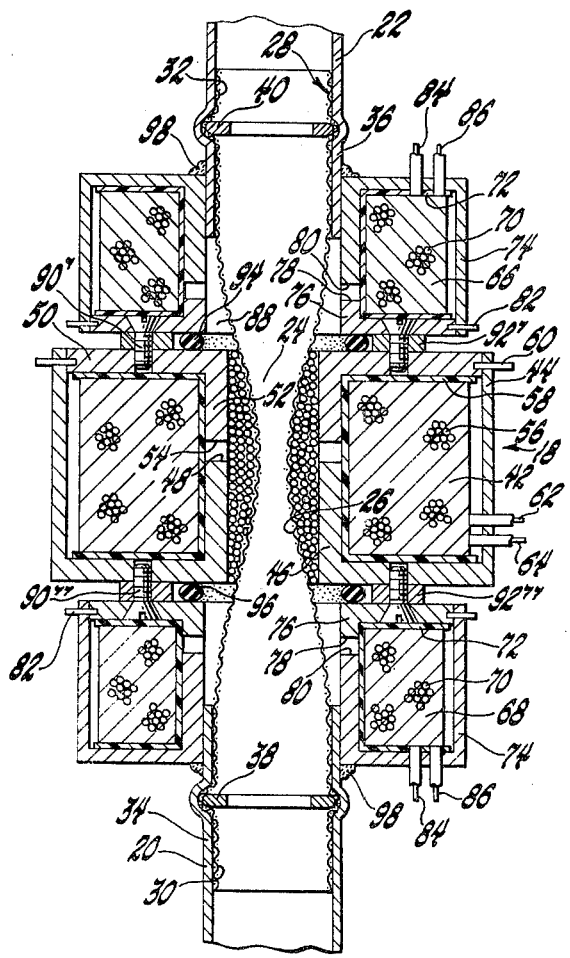
FIG. 3 is an enlarged sectioned view similar to FIG. 2 but showing the control valve in a partially closed operative condition.

The control valve 18 as best shown in FIGS. 2 and 3 includes a flow passage 24 formed by an intermediate portion 26 of a flexible and tubular member 28. The opposite ends 30, 32 of the tubular member are inserted into the inlet and outlet portions 34, 36 of the refrigerant lines 20, 22 and are attached thereto by outwardly expanded retaining rings 38, 40. The intermediate portion 26 of the tubular member 28 is encircled by a magnetic field producing coil assembly 42. The coil assembly 42 includes a hollow housing or shell 44 of magnetizable material and annular configuration which has an inner cylindrical wall 46 which extends from a first end of the housing shell 44 toward the other end but is terminated therebetween to form end surface 48. The other end of the housing 44 is closed by end member 50, having an inner cylindrical portion 52 which extends from the second end toward the first end but terminates at end surface 54 which is spaced a predetermined distance from surface 48. Members 46, 50 define a hollow interior in which a coil 56, including multiple wraps of conductive wire, is supported. The wires of the coil 56 are separated from the housing 46, 50 by a nylon bobbin or spool 58. Retainer pins 60 hold portions 44, 50 together.

The conductive wires of coil 56 are insulated from one another to permit voltage to be applied across the coil through leads 62, 64 which extend from the coil through the housing. When the coil 56 is energized by applying a voltage across leads 62, 64 a magnetic field is produced in the housing and across the gap between end surfaces 48, 54. This causes the end surfaces or portions 48, 54 to assume the characteristics of magnetic poles. The poles attract magnetically responsive material thereabout, such as iron particles, as will be hereinafter explained.

On either side of the main or primary magnetic field producing means 42, are located secondary magnetic field producing means 66, 68, both of annular configuration. The secondary magnetic means include coils 70 with multiple wraps of conductive wire which are insulated one from another and are wound around a nylon bobbin or sleeve 72. The coil and bobbin are enclosed in a housing or shell of magnetizable material which is of two parts 74, 76, much like members 44, 50. Gaps between end surfaces 78, 80 are formed in the secondary magnetic means 66, 68 and pins 82 hold the members 74, 76 together. Leads 84, 86 extend from the coil assemblies 66 and 68 to permit selective energization by applying a voltage thereacross.

The magnetic field producing means including the primary magnet 42 and the secondary magnets 66, 68 encircle tubular member 28 and define an annularly configured space 88 therebetween. Because tubular member 28 is flexible, the space 88 is of variable volume. The magnet assemblies are assembled as follows. The member 76 of assembly 66 is attached to the member 50 of assembly 42 by screw fasteners 90' and spacer 92'. Likewise, magnet assembly 68 is attached to the primary magnet assembly 42 by fasteners 90'' which extend through an annular spacer 92''. Fasteners 90 and the spacers 92 are of non-magnetizable material, such as brass or aluminum, to inhibit the cross formation of any magnetic field between the primary and secondary magnet assemblies. In addition, O-rings 94, 96 between the assemblies 42, 66, 68 provide a fluid-tight seal therebetween. The secondary magnetic assemblies 66 and 68 are attached in a fluid-tight manner by a weld or a braze, as designated by numeral 98.

The annular space 88 between the magnetic assemblies 42, 66, 68 and the tubular member 28 is partially filled with a plurality of relatively small particles of magnetizable material, such as iron. When the valve is in an open operative condition with the primary coil 56 de-energized and secondary coils 70 energized, the iron particles are attracted to the vicinity of surfaces 78, 80 and to the ends of space 88. This allows the intermediate portion 26 of the tubular member 28 to expand outward against the assembly 42 to permit a maximum flow of fluid through the control valve. When the valve is in a foreclosed operative condition, as shown in FIG. 3, the secondary electromagnetic coils 70 of assemblies 66, 68 are de-energized and the primary electromagnetic coil 56 of assembly 42 is energized. The magnetic poles created of surfaces 48, 54 attract iron particles about the intermediate portion of the tubular member 28 in the vicinity of the poles. An accumulation of iron particles forces the intermediate portion 26 of the flexible tubular member 28 radially inward to decrease the flow area through the control valve and thus create a flow restriction. The voltage level applied to the primary electromagnetic coil will directly effect the concentration of the iron particles about the poles formed by surfaces 48, 54. Thus, an increase in voltge resultantly increases the accumuiation and causes greater contraction of the intermediate portion 26. When an open operative condition is again needed, the primary electromagnetic coil 56 is de-energized and the secondary electromagnetic coils 70 are energized to attract the iron particles toward the ends of space 88 and away from the intermediate portion 26, permitting the intermediate portion to radially expand and increase the flow area through the control valve.

Although the illustrated embodiment is a preferred embodiment, it is contemplated that variations may be made, such as the use of permanent magnets in place of the electromagnetic assemblies 66 and 68 so as to maintain the iron particles in the position shown in FIG. 2 until the stronger primary magnetic field is energized. Thus, other embodiments and modifications might by adapted without falling outside the scope of the following claims which define the invention.

What is claimed is as follows:

1. A valve for controlling fluid flow comprising: means forming an inlet and an outlet to direct fluid through the valve; a radially flexible member having end portions attached to said inlet and outlet means, respectively, in a fluid-tight manner to cause fluid to flow through an intermediate portion of the tubular member; means having a substantially annular configuration encircling said intermediate portion of said flexible member and attached to said inlet and outlet means to limit outward expansion of said flexible member, thus forming a variable volume annular space therebetween; a plurality of relatively small particles partially filling said annular space capable of movement to end portions thereof to permit maximum outward expansion of said intermediate portion when the valve is in an open operative condition and alternately of movement to a central portion of said annular space encircling said intermediate portion of said flexible member when the valve is in a closed operative condition; means which may be selectively energized to cause movement of said particles, thereby producing an accumulation of particles encircling said intermediate portion and against the encircling housing means, thereby causing radial contraction of said flexible intermediate portion to decrease the flow area of the valve.

2. A valve for controlling fluid flow comprising: means forming an inlet and an outlet to direct fluid through the valve; a flexible tubular member having its end portions attached to said inlet and outlet means in a fluid-tight manner to cause the fluid to flow through an intermediate portion of the tubular member; hollow housing means having an annular configuration encircling said intermediate portion of said tubular member and attached to said inlet and outlet means to limit outward expansion of said tubular member and to form an annular space of variable volume about said tubular member; electromagnetic coil means contained within said hollow housing which may be selectively energized to create a magnetic field through said housing; said housing having inner cylindrical wall means extending from either housing end toward the opposite end and terminating in end surfaces which are closely spaced from one another and form magnetic poles encircling said intermediate portion of the tubular member when the coil means is energized; a plurality of relatively small particles of a material which is easily magnetized within said annular space; means adjacent said coil means for exerting an attractive force on said particles tending to move them away from the central portion of said annular space to permit said intermediate portion of said tubular member to expand against the encircling housing means, thereby allowing a maximum fluid flow therethrough when in an open operative condition, whereby a number of the magnetizable particles are attracted to and accumulate around the intermediate portion of the tubular member in the vicinity of said spaced end surfaces when the coil means is energized to force said intermediate portion radially inward, thus decreasing the flow area through the valve.

3. A valve for controlling fluid flow comprising: means forming an inlet and an outlet to direct fluid through the valve; a flexible tubular member having its end portions attached to said inlet and outlet means in a fluid-tight manner to cause the fluid to flow through an intermediate portion of the tubular member; hollow housing means having an annular configuration encircling said intermediate portion of said tubular member and attached to said inlet and outlet means to limit outward expansion of said tubular member and to form an annular space of variable volume about said tubular member; a primary electromagnetic coil means contained within said hollow housing which may be selectively energized to create a magnetic field through said housing; said housing having an inner cylindrical wall means extending from either end portion of said housing toward the opposite end portion and terminating in end surfaces which are closely spaced from one another and form magnetic poles encircling said intermediate portion of the tubular member when the primary coil means is energized; a plurality of relatively small particles of a material which is easily magnetized within said annular space; secondary magnetic field producing means adjacent said inlet and outlet on either side of said primary coil means selectively exerting an attractive force on said particles, tending to move them away from the central portion of said annular space to permit said intermediate portion of said tubular member to expand against the encircling housing means, thereby allowing a maximum fluid flow therethrough when in an open operative condition, whereby a number of the magnetizable particles are attracted to and around the intermediate portion of the tubular member in the vicinity of said spaced end surfaces when said primary coil means is energized to force said intermediate portion radially inward, thus decreasing the flow area through the valve.

* * * * *